(12) United States Patent
Wang et al.

(10) Patent No.: US 11,950,087 B2
(45) Date of Patent: Apr. 2, 2024

(54) AUDIO SIGNAL PROCESSING METHOD, ELECTRONIC APPARATUS, AND STORAGE MEDIUM

(71) Applicant: Beijing Xiaomi Mobile Software Co., Ltd., Beijing (CN)

(72) Inventors: Kai Wang, Beijing (CN); Runyu Shi, Beijing (CN); Xueyang Lv, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 77 days.

(21) Appl. No.: 17/703,494

(22) Filed: Mar. 24, 2022

(65) Prior Publication Data
US 2023/0044474 A1 Feb. 9, 2023

(30) Foreign Application Priority Data
Aug. 6, 2021 (CN) .......................... 202110902788.5

(51) Int. Cl.
*H04S 7/00* (2006.01)
*G06F 3/01* (2006.01)

(52) U.S. Cl.
CPC .............. *H04S 7/304* (2013.01); *G06F 3/012* (2013.01); *H04S 2400/11* (2013.01); *H04S 2420/01* (2013.01)

(58) Field of Classification Search
CPC .. H04S 7/304; H04S 2400/11; H04S 2420/01; G06F 3/012; G06F 3/01; G06F 3/011
See application file for complete search history.

(56) References Cited

U.S. PATENT DOCUMENTS

2019/0289416 A1 9/2019 York et al.
2021/0400417 A1* 12/2021 Freeman ................. H04S 7/304

FOREIGN PATENT DOCUMENTS

| CN | 107977082 | * | 5/2018 | ............... G06F 3/01 |
| CN | 114257920 A | | 3/2022 | |
| WO | 2019/045622 A1 | | 3/2019 | |
| WO | 2021/081035 A1 | | 4/2021 | |

OTHER PUBLICATIONS

Dada, "What do Sony and other TWS think of AirPods' new playing method in space audio," WWDC 20, Shenzhen Bay (Jun. 23, 2020).

* cited by examiner

*Primary Examiner* — Yosef K Laekemariam
(74) *Attorney, Agent, or Firm* — Volpe Koenig

(57) ABSTRACT

An audio signal processing method, includes acquiring a first distance between a current position and an initial position of a mobile device, and a second distance between the current position of the mobile device and a wearable device. Determining a first deflection angle according to the first distance, the second distance and the initial distance between the mobile device and the wearable device. Acquiring a second deflection angle of the wearable device reflecting a posture change. Determining relative position information between the mobile device and the wearable device according to the first deflection angle, the second deflection angle and the second distance and processing an audio signal based on the relative position information to obtain a playing audio played by the wearable device.

18 Claims, 6 Drawing Sheets

US 11,950,087 B2

AUDIO SIGNAL PROCESSING METHOD, ELECTRONIC APPARATUS, AND STORAGE MEDIUM

CROSS REFERENCE TO RELATED APPLICATIONS

The present application is proposed based on Chinese patent application No. 202110902788.5 filed on Aug. 6, 2021, and claims priority to the Chinese patent application, the content of which is incorporated herein in its entirety.

BACKGROUND ART

Spatial audio, also known as surround audio, refers to that surround sound channels are placed precisely in appropriate positions, so that a user can immersively feel the surround sound experience by turning his/her head.

SUMMARY

The disclosure relates to the technical field of spatial audio, in particular to an audio signal processing method, electronic apparatus, and storage medium.

In the first aspect, an embodiment of the disclosure provides an audio signal processing method, including:
acquiring a first distance between a current position and an initial position of a mobile device, and a second distance between the current position of the mobile device and a wearable device; the mobile device and the wearable device are in communication connection;
determining a first deflection angle of the mobile device according to the first distance, the second distance and the initial distance between the mobile device and the wearable device;
acquiring a second deflection angle of the wearable device reflecting a posture change;
determining relative position information between the mobile device and the wearable device according to the first deflection angle, the second deflection angle and the second distance; and
processing an audio signal based on the relative position information, to obtain a playing audio played by the wearable device.

In the second aspect, an embodiment of the disclosure provides an electronic device, including: a processor and a memory, storing computer instructions readable by the processor; when the computer instructions are read. The processor is configured to: acquire a first distance between a current position and an initial position of a mobile device, and a second distance between the current position of the mobile device and a wearable device; the mobile device and the wearable device are in communication connection; determine a first deflection angle of the mobile device according to the first distance, the second distance and the initial distance between the mobile device and the wearable device; acquire a second deflection angle of the wearable device reflecting a posture change; determine relative position information between the mobile device and the wearable device according to the first deflection angle, the second deflection angle and the second distance; and process an audio signal based on the relative position information to obtain a playing audio played by the wearable device.

In the third aspect, an embodiment of the disclosure provides a non-temporary storage medium used for storing the computer-readable instructions; and the computer-readable instructions are used for enabling a computer to execute an audio signal processing method. The method including: acquiring a first distance between a current position and an initial position of a mobile device, and a second distance between the current position of the mobile device and a wearable device; the mobile device and the wearable device are in communication connection; determining a first deflection angle of the mobile device according to the first distance, the second distance and the initial distance between the mobile device and the wearable device; acquiring a second deflection angle of the wearable device reflecting a posture change; determining relative position information between the mobile device and the wearable device according to the first deflection angle, the second deflection angle and the second distance; and processing an audio signal based on the relative position information to obtain a playing audio played by the wearable device.

BRIEF DESCRIPTION OF THE DRAWINGS

In order to explain the specific embodiments of the disclosure or the technical solutions in the related art more clearly, the accompanying drawings to be used in describing the specific embodiments or the related art will be briefly introduced below. Obviously, the accompanying drawings described below are only some embodiments of the disclosure. For those or ordinary skill in the art, other drawings can also be obtained based on these accompanying drawings without making creative efforts.

DETAILED DESCRIPTION OF THE EMBODIMENTS

The technical solution of the disclosure will be clearly and completely described below in combination with the accompanying drawings. It is obvious that the described embodiments are only parts of, rather than all of, the embodiments of the disclosure. Based on the embodiments of the disclosure, all the other embodiments obtained by those of ordinary skill in the art without making creative efforts will fall within the protection scope of the disclosure. In addition, the technical features described below and involved in different embodiments of the disclosure can be combined with each other, as long as there is no conflict.

At present, some manufacturers have introduced spatial audio technology into Bluetooth headphones. By installing an inertial measurement unit such as gyroscope and accelerometer in a headphone for calculation, a position and a posture change of the headphone can be obtained to realize the tracking of a wearer's head. When the wearer's head has a position and a posture change, a sound source can be remapped, so that the sound source heard by the wearer is kept in a fixed position to achieve a spatial surround audio effect.

In a related art, when the spatial audio effect is realized, the position of an imaginary sound source is fixed, but a mobile terminal is different from the sound source device (such as a TV set) in the fixed position. In an actual scenario, when a user watches a video while holding a mobile device, the mobile device will rotate along with the body, owing to the fixed position of the sound source, the user will subjectively perceive that the direction of the sound source remains at the original position. For another example, when a mobile device has a position change, a sound source heard by a user remains at an original position because the position and posture of a headphone is not changed. As a result, the subjectively perceived position of the sound source by the user is inconsistent with the actual position of the mobile device, causing poor experience in use.

Based on the existing defects in the related art, the embodiments of the disclosure provide an audio signal processing method and device, an electronic device and a storage medium, in order to improve a spatial audio effect and user experience of a wearable device.

Figure 1:
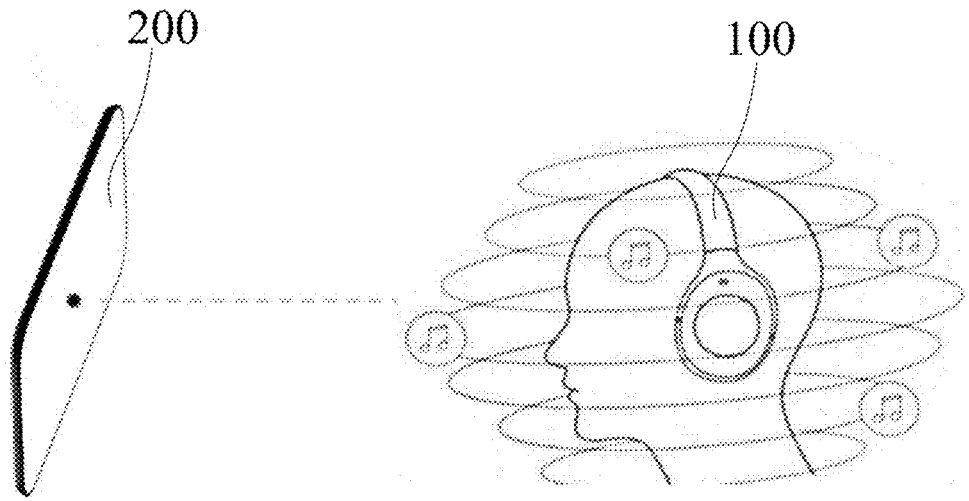
FIG. 1 is a schematic diagram of an application scenario in some embodiments of the disclosure.

Firstly, FIG. 1 shows a schematic diagram in some embodiments of the disclosure. As shown in FIG. 1, a system of an embodiment of the disclosure includes a wearable device 100 and a mobile device 200.

The wearable device 100 can be any device applicable for playing audio, and the wearable device can be worn on a human body to have angular deflection with movements of a user's limbs, that is, a posture change described in an embodiment of the disclosure. In some embodiments, the wearable device 100 can be a headphone, a true wireless stereo (TWS) headphone, etc.

The mobile device 200 can be any mobile device suitable for generating sound sources, the mobile device 200 can send audio signals to the wearable device 100, and the mobile device 200 has portability, such as mobile phone, tablet computer, music player, smart wearable device, etc.

In an embodiment of the disclosure, a wireless communication module is arranged on both of the wearable device 100 and the mobile device 200, respectively, and it is used for creating communication connection between the two devices, in order to realize data transmission between them. The wireless communication module includes, but is not limited to, a Bluetooth transmission module and a WiFi transmission module. the wearable device 100 and the mobile device 200 can also create communicable connection in a wired manner, which is not limited by the disclosure.

An angle measurement unit, a distance measurement unit and an inertial measurement unit are arranged in both the wearable device 100 and the mobile device 200, respectively. Examples of these units can be seen in at least FIG. 10, described herein. The angle measurement unit can be used for detecting a change in an attitude angle of the device itself to obtain relevant information generated by the rotation of the device. For example, the angle measurement unit includes a triaxial gyroscope, an accelerometer, etc. The range measurement unit can be used for detecting a moving distance of the device itself and a distance between the two devices. For example, when the mobile device 200 is moved, the distance measurement unit can detect the moving distance of the mobile device 200. In another example, the distance measurement unit can detect a distance between the mobile device 200 and the wearable device 100; and the distance measurement unit can be an ultra wide band (UWB) ranging module or a laser ranging module. The inertial measurement unit, also known as IMU, is a high-precision inertial sensor used for detecting a change in the position and posture of the device itself and calculating the position and posture information of the device according to a relevant inertial navigation algorithm.

Figure 2:
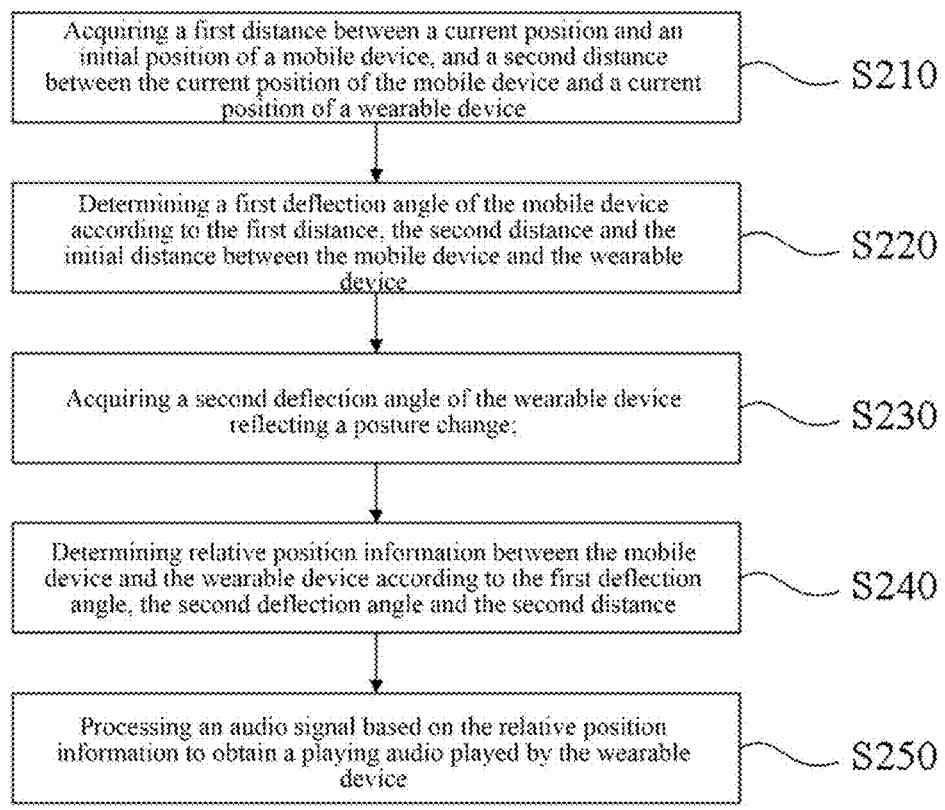
FIG. 2 is a flow chart of an audio signal processing method in some embodiments of the disclosure.

FIG. 2 shows an audio signal processing method in some embodiments of the disclosure, and the method can be applied in a system scenario as shown in FIG. 1. In some embodiments, considering that the operational capability of the mobile device 200 is often stronger than that of the wearable device 100, and thus the method of the disclosure can be performed and processed by a processor of the mobile device 200. However, those skilled in the art can understand that the method of the disclosure can also be performed and processed by a processor of the wearable device 100, or jointly performed and processed by the mobile device 200 and the wearable device 100, which is not limited by the disclosure.

As shown in FIG. 2, in some embodiments, an audio signal processing method of the disclosure includes step S210, of acquiring a first distance between a current position and an initial position of a mobile device, and a second distance between the current position of the mobile device and a current position of a wearable device.

Figure 3:
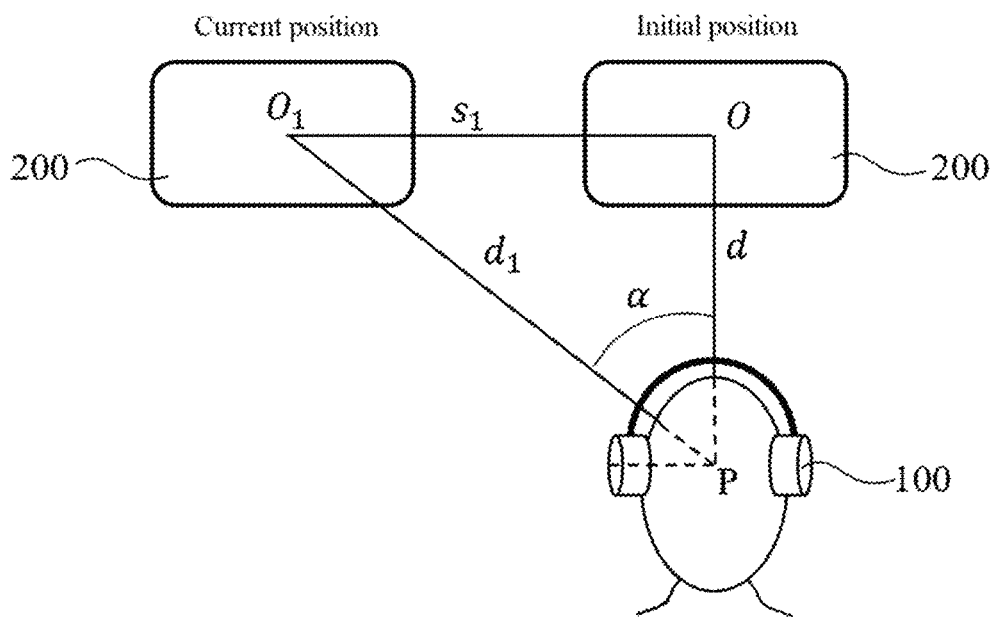
FIG. 3 is a schematic diagram of an audio signal processing method in some embodiments of the disclosure.

For example, as shown in FIG. 3, a user wears the wearable device 100 on the head to watch a video played on the mobile device 200, and the mobile device 200 sends an audio signal to the wearable device 100 through Bluetooth, so that the wearable device 100 can play the audio signal.

In a scenario, it is assumed that the mobile device 200 is moved from an initial position O to a current position $O_1$, and the wearable device 100 remains its position and posture unchanged. In the related art, as the position of an imaginary sound source is fixed at the initial position O, after the mobile device 200 is moved to the current position $O_1$, the user will subjectively perceive that the audio from the wearable device 100 still remains at the original position $O_1$, resulting in that the spatial audio effect is inconsistent with the actual position of the device, and thus lowering the user experience.

In another scenario, it is assumed that the user held the mobile device 200 in his hand, the mobile device 200 and the wearable device 100 are synchronously rotated by a certain angle, that is, their relative position remains unchanged. In the related art, as the rotation of the user's head drives the posture of the wearable device 100 to change, the system will process the audio signal, so that the position of the sound source that the user hears remains at the initial position subjectively, but in fact the relative position of the two devices has not changed, resulting in that the spatial audio effect is inconsistent with the actual position of the device, and lowering the user experience.

Therefore, in the embodiment of the disclosure, improvements are made in view of the defects existing in the related art. Taking FIG. 3 as an example again, when the mobile device 200 is moved from the initial position O to the current position $O_1$, the distance measurement unit in the mobile device 200 can detect the moving distance of the mobile device 200, that is, a line segment $OO_1$ in FIG. 3, which is recorded as the first distance $s_1$. At the initial position O, the distance measurement unit in the mobile device 200 and/or the wearable device 100 can detect the initial distance between the two devices, that is, a line segment OP in FIG.

3, which is recorded as the initial distance d. At the current position $O_1$, the distance measurement unit in the mobile device 200 and/or the wearable device 100 can detect the current distance between the two devices, that is, a line segment $O_1P$ in FIG. 3, which is recorded as the second distance $d_1$.

Referring back to FIG. 2, in step S220 a first deflection angle of the mobile device according to the first distance, the second distance and the initial distance between the mobile device and the wearable device is determined.

For example, as shown in FIG. 3, the line segments $OO_1$, OP and $O_1P$ are connected end to end to form a triangle $\triangle OO_1P$. Where, $O_1P$ represents a connecting line from the current position of the mobile device 200 to the wearable device 100, and OP represents a connecting line from the initial position of the mobile device 200 to the wearable device 100, so that an included angle $\angle OPO_1$ between $O_1P$ and OP represents the moving deflection angle α of the mobile device, that is, the first deflection angle α of the embodiment of the disclosure.

In some embodiments of the disclosure, the first deflection angle α can be calculated according to the first distance $s_1$, the second distance $d_1$ and the initial distance d. It will be specifically described in the following embodiments of the disclosure, and will not be repeated in detail here.

Referring back to FIG. 2, in step S230 a second deflection angle of the wearable device reflecting a posture change is acquired.

In a scenario of the embodiment of the disclosure, attention is paid to not only the position change of the mobile device 200 but also the posture change of the wearable device 100.

For example, in an example as shown in FIG. 3, the mobile device 200 is moved from the initial position O to the current position $O_1$, and the user's head posture remains unchanged, that is, the wearable device 100 remains its posture unchanged. Under this condition, the second deflection angle of the wearable device reflecting the posture change is zero or unchanged.

In another example, it is assumed that the mobile device 200 is moved from the initial position O to the current position $O_1$, and the user's head rotates by a certain angle. Accordingly, the wearable device 100 has a corresponding posture change along with the user's head, and at this time, the second deflection angle of the wearable device 100 reflecting the posture change can be obtained.

In some embodiments, the second deflection angle can be detected by the angle measurement unit arranged in the wearable device 100. In some other embodiments, the posture change can be detected by the inertial measurement unit arranged in the wearable device 100, and the second deflection angle of the wearable device 100 reflecting the posture change can be calculated according to a signal measured by the inertial measurement unit. In some other embodiments of the disclosure, the second deflection angle of the wearable device 100 reflecting the posture change can also be obtained by the angle measurement unit and the inertial measurement unit arranged in the wearable device 100. It will be specifically described in the following embodiments of the disclosure, and will not be repeated in detail here.

Referring back to FIG. 2, in step S240 relative position information between the mobile device and the wearable device according to the first deflection angle, the second deflection angle and the second distance is determined.

It can be understood that the first deflection angle represents a position deflection angle of the mobile device 200, and the second deflection angle represents the posture deflection angle of the wearable device 100, so that a relative azimuth angle between the mobile device 200 and the wearable device 100 can be obtained according to the first deflection angle and the second deflection angle. The relative azimuth angle represents the azimuth information between the two devices, and the second distance represents the current distance information between the two devices, so that the relative position information of the two devices can be accurately defined according to the relative azimuth angle and the second distance. It will be specifically illustrated below in combination with the embodiment in FIG. 4.

Figure 4:
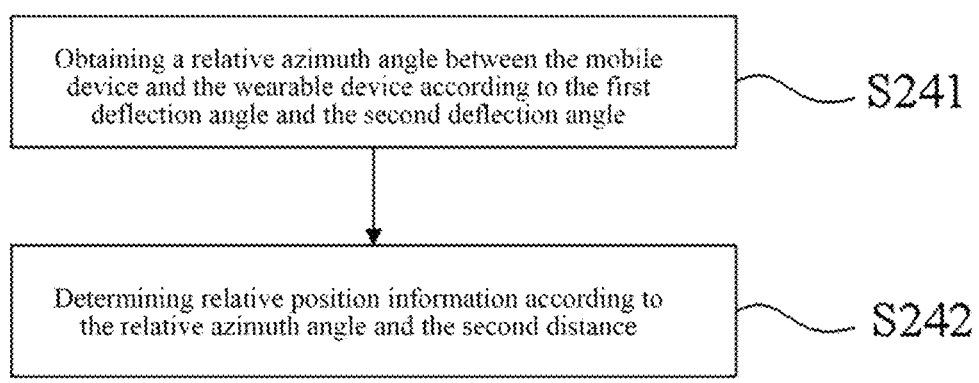
FIG. 4 is a flow chart of an audio signal processing method in some embodiments of the disclosure.

As shown in FIG. 4, in some modes of implementation, in an audio signal processing method of the disclosure, a process of determining the relative position information between the mobile device and the wearable device include step S241 of obtaining a relative azimuth angle between the mobile device and the wearable device according to the first deflection angle and the second deflection angle.

Figure 5:
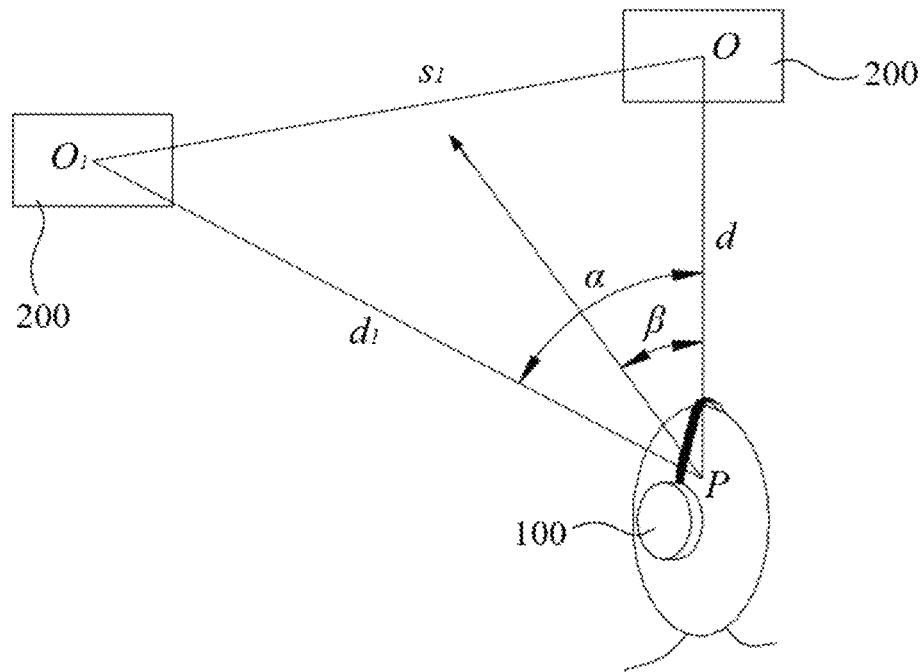
FIG. 5 is a schematic diagram of an audio signal processing method in some embodiments of the disclosure.

For example, in a scenario as shown in FIG. 5, the mobile device 200 is moved from the initial position O to the current position $O_1$, meanwhile the user rotates his head to the left for a certain angle from a position directly opposite to the initial position O, and the arrow direction represents the direction to which the user is directly opposite. In this process, the second deflection angle β of the wearable device 100 reflecting the position and posture change can be detected by the angle measurement unit and the inertial measurement unit in the wearable device 100. Besides, the first deflection angle α of the mobile device 200 can be calculated based on the process described in S230.

After the first deflection angle α and the second deflection angle β are obtained, the relative azimuth angle between the mobile device and the wearable device can be obtained according to their difference value. For another example, in the example as shown in FIG. 5, assuming that the first deflection angle α is 65° and the second deflection angle β is 35°, the relative azimuth angle can be calculated as (65°−35°)=30°. It is indicated that the mobile device 200 is at 30° in the left front of the wearable device 100.

Referring back to FIG. 4, in step S242 the relative position information according to the relative azimuth angle and the second distance is determined.

It can be understood that the relative azimuth angle represents the relative azimuth between the mobile device 200 and the wearable device 100, and their relative position can be accurately expressed in combination with the distance between the two devices.

In an embodiment of the disclosure, the distance between the mobile device 200 and the wearable device 100 is the second distance $d_1$ which can be determined by the method as described in S210, and it will not be repeated in the disclosure.

The relative position information between the mobile device 200 and the wearable device 100 can be determined according to the relative azimuth angle and the second distance.

Referring back to FIG. 2, in the final step S250, processing an audio signal based on the relative position information, to obtain a playing audio played by the wearable device is performed.

HRTF (Head Related Transfer Functions) is an audio localization algorithm; in the existing applications, based on tracking the movements of a user's head, a sound source can be remapped using the HRTF, so that the headphone can produce various spatial auditory effects. A basic principle of the HRTF can be considered as that an audio signal is processed by remapping based on different head-related parameters, to obtain the playing audio of a corresponding auditory effect. The head-related parameters represent relative position and posture information between the mobile device and the wearable device.

Figure 6:
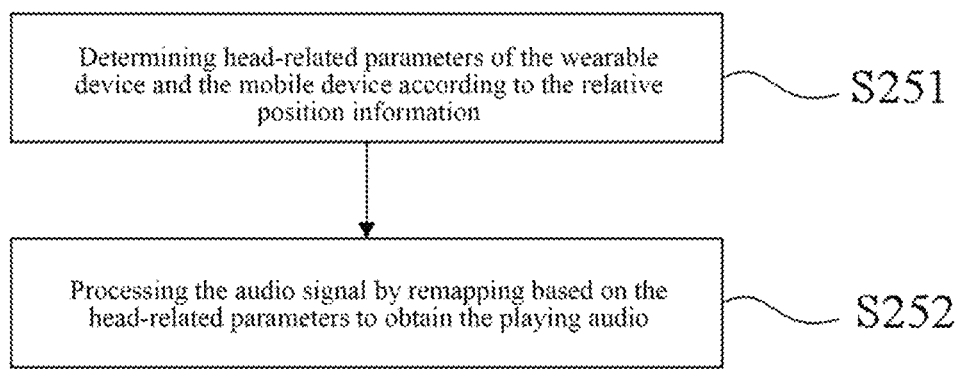
FIG. 6 is a flow chart of an audio signal processing method in some embodiments of the disclosure.

FIG. 6 shows a process of obtaining a playing audio according to relative position information in some embodiments of the disclosure, which will be specifically illustrated below in combination with FIG. 6.

As shown in FIG. 6, in some embodiments, an audio signal processing method of the disclosure includes step S251 of determining head-related parameters of the wearable device and the mobile device according to the relative position information. Then in step S252 processing the audio signal by remapping based on the head-related parameters, to obtain the playing audio is performed.

Based on the above-mentioned principle, after the relative position information of the wearable device 100 and the mobile device 200 is determined, the head-related parameters between the wearable device 100 and the mobile device 200 can be determined according to the relative position information.

After the head-related parameters are determined, the audio signal transferred by the mobile device 200 can be remapped based on the HRTF algorithm, so as to obtain the processed playing audio. The mobile device 200 can send the processed playing audio to the wearable device 100, and the wearable device 100 will play it, so that the user can hear the spatial surround audio effect.

It should be noted that, in the embodiments of the disclosure, the relative position information represents the relative position relationship between the wearable device 100 and the mobile device 200. Different from the solution in the related art in which an imaginary sound source is in a fixed position, in the embodiments of the disclosure, the relative position relationship between the wearable device 100 and the mobile device 200 is used for remapping an audio signal.

For example, in the example as shown in FIG. 3, when the user rotates while holding the mobile device 200 in his hand, that is, the mobile device 200 and the wearable device 100 are synchronously rotated. Although the wearable device 100 has position and posture changes, the relative position between the mobile device 200 and the wearable device 100 remains unchanged. Therefore, the remapped sound source in the embodiment of the disclosure can still be kept in direct front of the user, so that the auditory position of the sound source is kept consistent with the actual position of the mobile device 200, improving the auditory experience.

For another example, in the scenario as shown in FIG. 3, the user's head posture remains unchanged, and the mobile device 200 is moved from the initial position O to the current position $O_1$. In the embodiment of the disclosure, the first deflection angle of the mobile device 200 can be detected, a change in the relative position information caused by the mobile device 200 can be obtained to realize the processing of the audio signal. Thus, the auditory position of the sound source is kept consistent with the actual position of the mobile device 200, improving the auditory experience.

In addition, it should be noted that, in some embodiments of the disclosure, the relative position information between the wearable device 100 and the mobile device 200 is represented by the relative azimuth angle and distance between the two devices. This is because, for the wearable device 100 and the mobile device 200, there are small changes in their positions and postures, and the traditional inertial navigation technology is less observable in such small position and posture changes, and it is difficult to solve the position and posture information with high accuracy. If the relative position relationship between the wearable device and the mobile device is calculated directly by using their position information, the error is too large to apply. Therefore, in some embodiments of the disclosure, the relative position information between the wearable device and the mobile device is expressed based on the relative azimuth angle and distance between the two devices, so as to improve the detection accuracy.

It can be known from the above descriptions that in the embodiments of the disclosure, the audio signal is processed based on the relative position information between the wearable device and the mobile device to realize the spatial surround audio, improving the audio playing effect. Besides, as compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Besides, the relative position information between the wearable device and the mobile device is expressed based on the relative azimuth angle and distance between the two devices, improving the detection accuracy.

In some embodiments, in an audio signal processing method of the disclosure, a process of determining the first deflection of the mobile device includes determining the first deflection angle based on the law of cosines according to the first distance, the second distance and the initial distance.

Specifically, taking the scenario as shown in FIG. 3 as an example, the mobile device 200 is moved from the initial position O to the current position $O_1$. The line segments $OO_1$, OP and $O_1P$ are connected end to end to form a triangle $\Delta OO_1P$; where, $O_1P$ represents a connecting line from the current position of the mobile device 200 to the wearable device 100, and OP represents a connecting line from the initial position of the mobile device 200 to the wearable device 100, so that an included angle $\angle OPO_1$ between $O_1P$ and OP represents the moved deflection angle $\alpha$ of the mobile device, that is, the first deflection angle $\alpha$ of the embodiment of the disclosure.

Based on a formula of the law of cosines:

$$\cos\alpha = \frac{d^2 + d_1^2 - s_1^2}{2d \cdot d_1}$$

It can be inferred that:

$$\alpha = \arccos\left(\frac{d^2 + d_1^2 - s_1^2}{2d \cdot d_1}\right)$$

In the above formula, d represents the initial distance, $d_1$ represents the second distance, and $s_1$ represents the first distance. Thus, the first deflection angle $\alpha$ can be obtained by calculation through the above formula.

The second deflection angle $\beta$ can be detected by the angle measurement unit of the wearable device 100, or resolved by the inertial measurement unit of the wearable device 100, or obtained by combining both of the detection results, which will be illustrated below in the disclosure, respectively.

In some embodiments, considering that the angle measurement unit, such as UWB angle measurement module and ultrasonic angle measurement module, has high detection accuracy in case of a smaller rotation angle (for example, within a range of ±60°). Therefore, when the rotation angle of the wearable device 100 is small, for example, the second deflection angle |β|≤60°, a signal for the posture change of the wearable device 100 can be detected using the angle measurement unit, and then the second deflection angle is obtained according to the measured signal.

In some embodiments, considering that the angle measurement units, such as UWB angle measurement module and ultrasonic angle measurement module, the detection accuracy will be obviously reduced in case of a larger rotation angle (for example, exceeding a range of ±60°). Therefore, when the rotation angle of the wearable device 100 is large and the second deflection angle |β|>60°, the information for the posture change of the wearable device 100 can be detected using the inertial measurement unit of the wearable device 100, and then the second deflection angle is resolved according to the detected signal based on the inertial navigation algorithm.

Further, in some embodiments, considering that both the angle measurement device and the inertial measurement device can realize angle measurement in case of a smaller rotation angle (for example, within a range of ±60°) of the wearable device 100, therefore, both of the detection results can be fused based on the Kalman filter algorithm to improve the detection accuracy of the second deflection angle.

It can be known from the above descriptions that in the embodiments of the disclosure, the second deflection angle of the wearable device can be determined by multiple methods to meet the application for more scenarios, and meanwhile the detection accuracy can be improved.

In some embodiments, in an audio signal processing method of the disclosure, a corresponding trigger switch can be arranged on the mobile device 200 or the wearable device 100, and a user can manually turn on/off the trigger switch to implement and disable the above process.

In an example, a corresponding trigger switch can be arranged on a video playing interface of the mobile device, and the trigger switch can be present when a user wears the wearable device. In this way, when the user wears the wearable device 100 to watch a video playing on the mobile device 200, the trigger switch will be manually turned on. The mobile device 200 can detect a state of the trigger switch, and when it is detected that the trigger switch is on, the above audio signal processing process can be performed.

In other embodiments, the trigger switch can also be arranged on the wearable device 100, and the trigger switch can be either a virtual touch switch on the mobile device or the wearable device, or a real physical button, which is not limited in the disclosure.

In some embodiments, the wearable device 100 of an example of the disclosure can include TWS earphones or a headset, and the mobile device can include a smartphone. The smartphone can send an audio signal to the headphone, and the headphone plays the corresponding playing audio.

In an example, as shown in FIG. 5, the user wearing the wearable device 100 faces the mobile device 200 and watches a video, the user manually turns on the trigger switch on the mobile device 200, and the position where the user turns on the trigger switch is the initial position; and the mobile device 200 detects the initial distance d between the mobile device 200 and the wearable device 100 through the distance measurement unit.

When the mobile device is moved from the initial position O to the current position $O_1$, the mobile device 200 detects the first distance $s_1$ between the initial position O and the current position $O_1$, as well as the second distance $d_1$ between the current position of the mobile device 200 and the wearable device 100 through the distance measurement unit. Meanwhile, the user's head drives the wearable device 100 to rotate by 35° to the left from the initial posture, so that the angle measurement unit of the wearable device 100 can detect that the second deflection angle β is 35°.

According to the first distance $s_1$, the second distance $d_1$ and the initial distance d, the mobile device 200 calculates the first deflection angle α to be 65° based on the above formula of the laws of cosines. According to the first deflection angle α, the second deflection angle β and the second distance $d_1$, it is determined that the current relative position information between the mobile device 200 and the wearable device 100 is "the mobile device is at 30° in the left front of the wearable device, and the distance between them is $d_1$". The corresponding head-related parameters are obtained according to the relative position information, an audio signal is remapped according to the head-related parameters and then sent to the wearable device, and the wearable device emits the processed playing audio through a receiver, so that the user can hear the audio with a spatial surround effect.

It can be known from the above descriptions that in the embodiments of the disclosure, the audio signal is processed based on the relative position information between the wearable device and the mobile device to realize the spatial surround audio, improving the audio playing effect. Besides, as compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Besides, the relative position information between the wearable device and the mobile device is expressed based on the relative azimuth angle and distance between the two devices, improving the detection accuracy.

In some embodiments, considering that the operational capability of the mobile device 200 is often stronger than that of the wearable device 100, and thus the processing steps of the method in the above embodiment can be performed and processed by a processor of the mobile device 200. It will be illustrated below in combination with FIG. 7.

Figure 7:
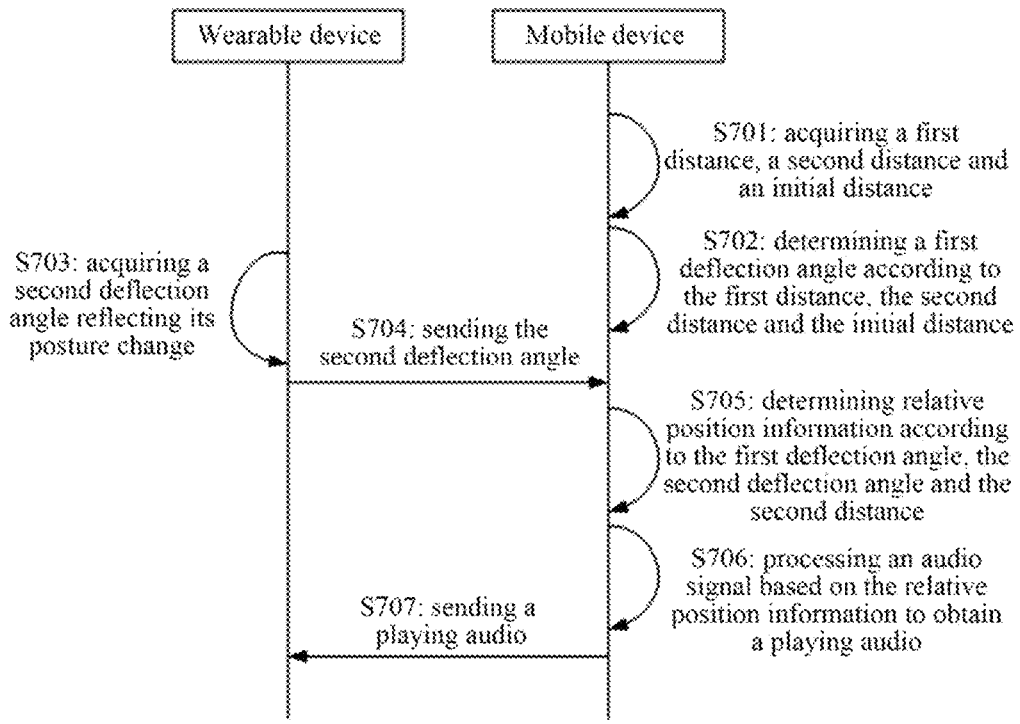
FIG. 7 is a flow chart of an audio signal processing method in some embodiments of the disclosure.

As shown in FIG. 7, in some embodiments, an audio signal processing method of the disclosure includes step S701, where a mobile device acquires a first distance between a current position and an initial position, a second distance between the current position of the mobile device and a current position of a wearable device, and an initial distance between the mobile device and the wearable device. Specifically, in some embodiments, when the mobile device is moved from the initial position to the current position, the first distance, the second distance and the initial distance can be detected by a distance measurement unit arranged on the mobile device. The specific process can refer to the previously described embodiment, which will not be repeated again.

Then in step S702, the mobile device determines the first deflection angle according to the first distance, the second distance and the initial distance. Specifically, the mobile device can determine the first deflection angle in accordance with the process described in S220, which will not be repeated in the disclosure.

Next in step S703, the wearable device acquires a second deflection angle reflecting its posture change. Specifically, in some embodiments, the second deflection angle of the wearable device reflecting the posture change can be detected by an angle measurement unit arranged in the wearable device 100. In some other embodiments, the posture change can be detected by the inertial measurement unit arranged in the wearable device 100, and the second deflection angle of the wearable device 100 reflecting the posture change can be calculated according to a signal measured by the inertial measurement unit. It will not be repeated again in the disclosure.

Then in step S704, the mobile device receives the second deflection angle sent by the wearable device. In an example, the wearable device 100 and the mobile device 200 can create wireless communication connection through a Bluetooth module, so that the wearable device 100 can send the second deflection angle to the mobile device 200 through the Bluetooth module.

Next in step S705, the mobile device determines relative position information according to the first deflection angle, the second deflection angle and the second distance. Specifically, those skilled in the art can understand and fully implement the step by reference to S240 as described above, which will not be repeated again in the disclosure.

Then in step S706, the mobile device processes an audio signal based on the relative position information, to obtain a playing audio. Specifically, after obtaining the relative position information, the mobile device 200 can remap the audio signal in accordance with the process in the previously described embodiment to obtain the playing audio. The specific process can refer to the previously described embodiment, which will not be repeated again.

Finally, in step S707, the mobile device sends the playing audio to the wearable device. In an example, the wearable device 100 and the mobile device 200 can create wireless communication connection through a Bluetooth module, so that the mobile device 200 can send the playing audio to the wearable device 100 through the Bluetooth module. The wearable device 100 receiving the playing audio can play the audio through the receiver, so that the user can hear the playing audio with a spatial surround effect.

It can be known from the above descriptions that in the embodiments of the disclosure, the mobile device is used for data processing, and thus the method with a lower requirement for the operational capability of the wearable device is applicable for various wearable devices.

In some embodiments, the processing steps of the method in the above embodiment of the disclosure can be performed and processed by a processor of the wearable device 100. It will be illustrated below in combination with FIG. 8.

Figure 8:
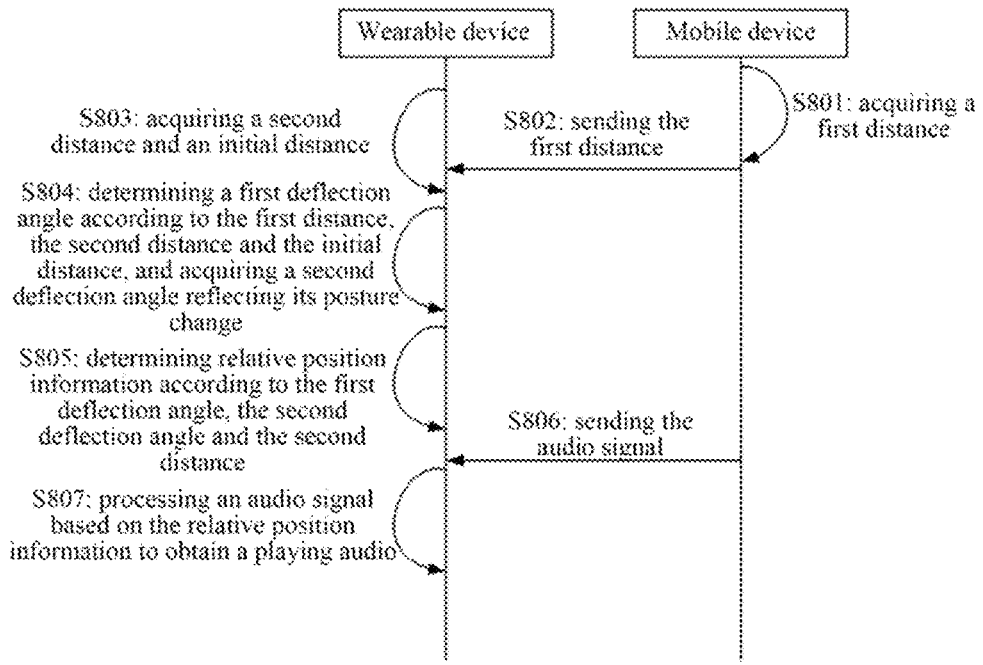
FIG. 8 is a flow chart of an audio signal processing method in some embodiments of the disclosure.

As shown in FIG. 8, in some embodiments, an audio signal processing method of the disclosure includes step S801 where a mobile device acquires a first distance between a current position and an initial position. Specifically, in some embodiments, when the mobile device is moved from the initial position to the current the first distance, the first distance can be detected by a distance measurement unit arranged on the mobile device.

Next, in step S802, the wearable device receives the first distance sent by the mobile device. In an example, the wearable device 100 and the mobile device 200 can create wireless communication connection through a Bluetooth module, so that the mobile device 200 can send the first distance to the wearable device 100 through the Bluetooth module.

Then in step S803, a wearable device acquires a second distance between the current position of the mobile device and the wearable device, and an initial distance between the mobile device and the wearable device. Specifically, the second distance and the initial distance can be detected by a distance measurement unit arranged on the wearable device. The specific process can refer to the previously described embodiment, which will not be repeated again.

Next in step S804, the wearable device determines a first deflection angle according to the first distance, the second distance and the initial distance, and the wearable device acquires a second deflection angle reflecting its posture change. Specifically, the wearable device can determine the first deflection angle in accordance with the process described in S220, which will not be repeated in the disclosure.

In some embodiments, the second deflection angle can be detected by the angle measurement unit arranged in the wearable device 100. In some other embodiments, the posture change can be detected by an inertial measurement unit arranged in the wearable device 100, and the second deflection angle of the wearable device 100 reflecting the posture change can be resolved according to a measured signal from the inertial measurement unit. It will not be repeated again in the disclosure.

In step S805, the wearable device determines relative position information between the mobile device and the wearable device according to the first deflection angle, the second deflection angle and the second distance. Specifically, those skilled in the art can understand and fully implement the step by reference to S240 as described above, which will not be repeated again in the disclosure.

Then in step S806, the wearable device receives an audio signal sent by the mobile device. In an example, the wearable device 100 and the mobile device 200 can create a wireless communication connection through a Bluetooth module, so that the mobile device 200 can send the audio signal to the wearable device 100 through the Bluetooth module.

Finally, in step S807, the wearable device processes an audio signal based on the relative position information, to obtain a playing audio. Specifically, after obtaining the relative position information, the wearable device 100 can remap the received audio signal in accordance with the process in the previously described embodiment to obtain the playing audio. The specific process can refer to the previously described embodiment, which will not be repeated again.

After obtaining the processed playing audio, the wearable device 100 can play the audio through the receiver, so that the user can hear the playing audio with a spatial surround effect.

It can be known from the above descriptions that in the embodiments of the disclosure, the wearable device is used for data processing, and thus the method with a lower requirement for the operational capability of the mobile device is applicable for various mobile devices.

Figure 9:
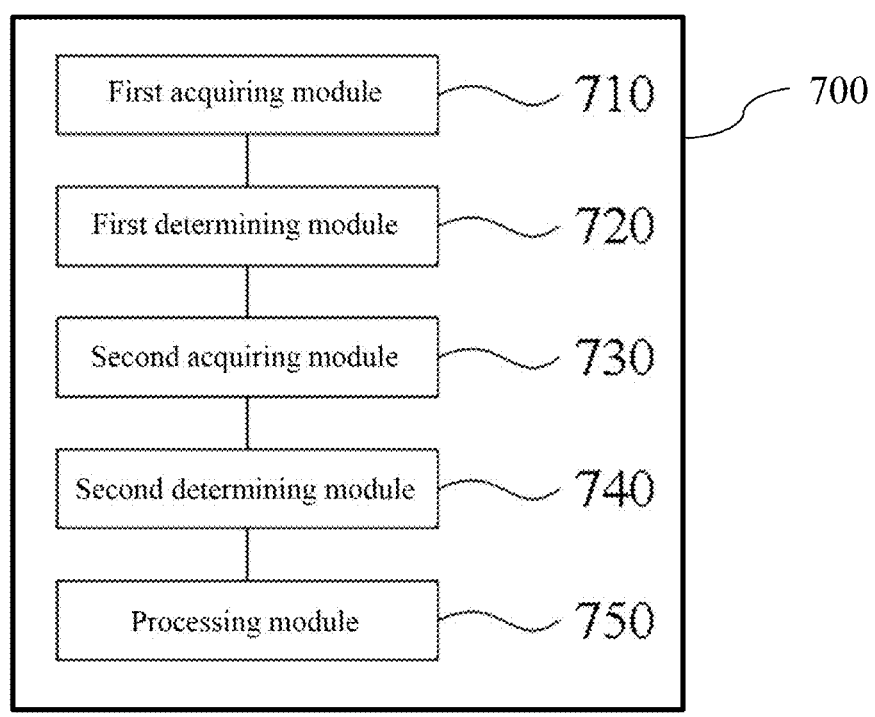
FIG. 9 is a structure diagram of an audio signal processing device in some embodiments of the disclosure.

An embodiment of the disclosure provides an audio signal processing device 700, as shown in FIG. 9, and in some embodiments, an audio signal processing device of the disclosure includes a first acquiring module 710, which is configured to acquire a first distance between a current position and an initial position of a mobile device, and a second distance between the current position of the mobile device and a wearable device. The mobile device and the wearable device are in communication connection.

The audio signal processing device 700 also includes a first determining module 720, which is configured to determine a first deflection angle of the mobile device according to the first distance, the second distance and the initial distance between the mobile device and the wearable device. A second acquiring module 730 is also included. The Second acquiring module 730 is configured to acquire a second deflection angle of the wearable device reflecting a posture change.

The audio signal processing device 700 further includes a second determining module 740 and a processing module 750. The second determining module 740 is configured to determine relative position information between the mobile device and the wearable device according to the first deflection angle, the second deflection angle and the second distance.

The processing module 750 is configured to process an audio signal based on the relative position information, and to obtain a playing audio played by the wearable device.

It can be known from the above descriptions that in the embodiments of the disclosure, the audio signal is processed based on the relative position information between the wearable device and the mobile device to realize the spatial surround audio, improving the audio playing effect. Besides, as compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Besides, the relative position information between the wearable device and the mobile device is expressed based on the relative azimuth angle and distance between the two devices, improving the detection accuracy.

In some embodiments, the first acquiring module 710 is specifically configured to detect and least one of the first distance by a distance measurement unit arranged on the mobile device and the second distance by the distance measurement unit arranged on the mobile device and/or arranged on the wearable device.

In some embodiments, the first determining module 720 is specifically configured to determine the first deflection angle based on the law of cosines according to the first distance, the second distance and the initial distance. The first deflection angle is an included angle between a line from the current position of the mobile device to the wearable device and a line from the initial position of the mobile device to the wearable device.

In some embodiments, the second acquiring module 730 is specifically configured to perform at least one of detecting the second deflection angle by an angle measurement unit arranged on the wearable device and obtaining the second deflection angle by resolving a measured signal from an inertial measuring device arranged on the wearable device.

In some embodiments, the second determining module 740 is specifically configured to obtain a relative azimuth angle between the mobile device and the wearable device according to the first deflection angle and the second deflection angle; and determine the relative position information according to the relative azimuth angle and the second distance.

In some embodiments, the processing module 750 is specifically configured to: determine head-related parameters of the wearable device and the mobile device according to the relative position information; and process the audio signal by remapping based on the head-related parameters, to obtain the playing audio.

In some embodiments, the audio signal processing device 700 of the disclosure also includes: a detecting module, which is configured to detect a state of a trigger switch on the mobile device, and execute the step of acquiring first rotating information and second rotating information in response to turn-on of the trigger switch.

It can be known from the above descriptions that in the embodiments of the disclosure, the audio signal is processed based on the relative position information between the wearable device and the mobile device to realize the spatial surround audio, improving the audio playing effect. Besides, as compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Besides, the relative position information between the wearable device and the mobile device is expressed based on the relative azimuth angle and distance between the two devices, improving the detection accuracy.

An embodiment of the disclosure provides an electronic device, including a processor and a memory, storing computer instructions readable by the processor; when the computer instructions are read, the processor executes the method described in any of the above-mentioned embodiments.

An embodiment of the disclosure provides a storage medium used for storing the computer-readable instructions; and the computer-readable instructions are used for enabling a computer to execute the method described in any of the above-mentioned embodiments.

Figure 10:
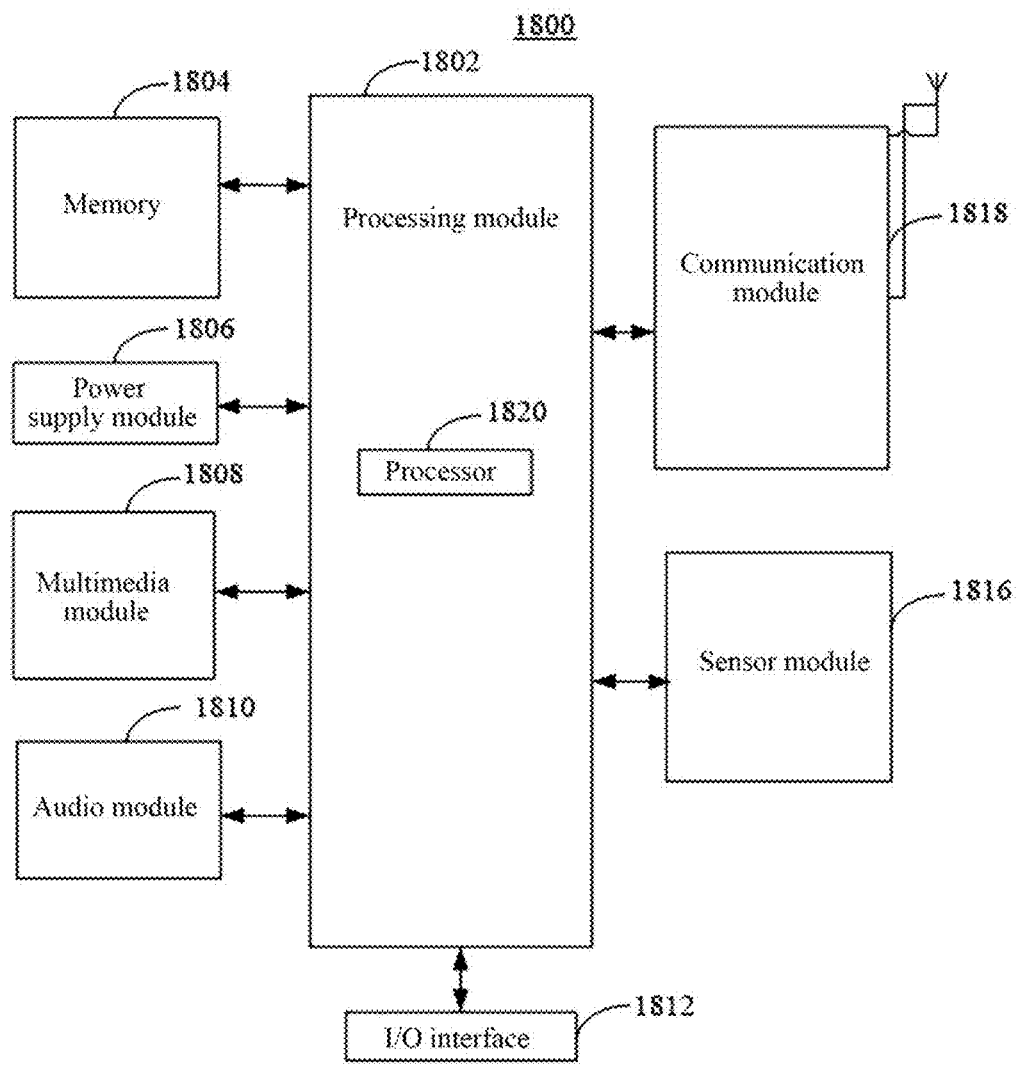
FIG. 10 is a structure diagram of an electronic device applicable for an audio signal processing method of the disclosure.

FIG. 10 shows a structure diagram of an electronic device in some embodiments of the disclosure, and relevant principles of the electronic device and the storage medium of some embodiments of the disclosure are illustrated below in combination with FIG. 10.

As shown in FIG. 10, an electronic device 1800 can include one or some of the following components: a processing module 1802, a memory 1804, a power supply module 1806, a multimedia module 1808, an audio module 1810, an input/output (I/O) interface 1812, a sensor module 1816 and a communication module 1818.

The processing module 1802 generally controls the overall operation of the electronic device 1800, such as operations associated with display, phone calls, data communications, camera operations and recording operations. The processing module 1802 can include one or more processors 1820 to execute instructions. In addition, the processing module 1802 can include one or more modules to facilitate interaction of the processing module 1802 with other components. For example, the processing module 1802 can include a multimedia module to facilitate interaction of the multimedia module 1808 with the processing module 1802. For another example, the processing module 1802 can read an executable instruction from the memory to implement related functions of the electronic device.

The memory 1804 is configured to store various data to support operations on the electronic device 1800. Examples of such data include instructions for any application or method operating on the electronic device 1800, contact data, phonebook data, messages, images, videos, etc. The memory 1804 can be implemented by any type of volatile or non-volatile storage device or a combination thereof, such as static random access memory (SRAM), electrically erasable programmable read-only memory (EEPROM), erasable programmable memory programmable read-only memory (EPROM), programmable read-only memory (PROM), read-only memory (ROM), magnetic memory, flash memory, magnetic disk or optical disk.

The power supply module 1806 provides power to various components of the electronic device 1800. The power supply module 1806 can include a power management system, one or more power supplies, and other components associated with generating, managing and distributing power to the electronic device 1800.

The multimedia module 1808 includes a display screen providing an output interface between the electronic device 1800 and a user. In some embodiments, the multimedia module 1808 includes a front camera and/or a rear camera. When the electronic device 1800 is in an operation mode, such as shooting mode or video mode, the front camera and/or the rear camera can receive external multimedia data. Each of the front camera and the rear camera can be a fixed optical lens system or have focal length and optical zooming capability.

The audio module 1810 is configured to output and/or input audio signals. For example, the audio module 1810 includes a microphone (MIC); when the electronic device 1800 is in an operation mode, such as call mode, record mode and voice recognition mode, the microphone is configured to receive an external audio signal. The received audio signal can be further stored in the memory 1804 or transmitted via the communication module 1818. In some embodiments, the audio module 1810 also includes a speaker for outputting audio signals.

The I/O interface 1812 provides an interface between the processing module 1802 and a peripheral interface module, which can be a keyboard, a click wheel or buttons. These buttons can include, but are not limited to, a home button, volume buttons, a start button and a lock button.

The sensor module 1816 includes one or more sensors for providing various aspects of status assessment for the electronic device 1800. For example, the sensor module 1816 can detect an on/off state of the electronic device 1800, and the relative positioning of components, such as components are a display and a keypad of the electronic device 1800. The sensor module 1816 can also detect the position change of the electronic device 1800 or a component of the electronic device 1800, the presence or absence of user contact with the electronic device 1800, the direction or acceleration/deceleration of the electronic device 1800, and a change in the temperature of the electronic device 1800. The sensor module 1816 can include a proximity sensor which is configured to detect the presence of nearby objects in the absence of any physical contact. The sensor module 1816 can also include a light sensor, such as CMOS or CCD image sensor, which is used in an imaging application. In some embodiments, the sensor module 1816 can also include an acceleration sensor, a gyroscope sensor, a magnetic sensor, a pressure sensor or a temperature sensor.

The communication module 1818 is configured to facilitate wired or wireless communication between the electronic device 1800 and other devices. The electronic device 1800 can be accessed to a wireless network based on a communication standard, such as Wi-Fi, 2G, 3G, 4G, 5G or 6G, or a combination thereof In one embodiment, the communication module 1818 receives broadcast signals or broadcast related information from an external broadcast management system via a broadcast channel. In an embodiment, the communication module 1818 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the electronic device 1800 can be implemented by one or more application specific integrated circuits (ASICs), a digital signal processor (DSP), a digital signal processing device (DSPD), a programmable logic device (PLD), a field programmable gate array (FPGA), a controller, a micro-controller, a microprocessor or other electronic components.

It is obvious that, the above-mentioned embodiments are only examples for clear illustration, rather than limitation of the embodiments. For those of ordinary skills in the art, other different forms of changes or modifications can also be obtained on the basis of the above illustrations. It is unnecessary and also unable to list all the embodiments. The obvious changes or variations derived will still fall within the protection scope of the disclosure.

What is claimed is:

1. An audio signal processing method, comprising the following steps:
    acquiring a first distance between a current position and an initial position of a mobile device, and a second distance between the current position of the mobile device and a wearable device; the mobile device and the wearable device are in communication connection;
    determining a first deflection angle of the mobile device according to the first distance, the second distance and the initial distance between the mobile device and the wearable device;
    acquiring a second deflection angle of the wearable device reflecting a posture change;
    determining relative position information between the mobile device and the wearable device according to the first deflection angle, the second deflection angle and the second distance; and
    processing an audio signal based on the relative position information to obtain a playing audio played by the wearable device;
    wherein the step of determining a first deflection angle of the mobile device according to the first distance, the second distance and the initial distance between the mobile device and the wearable device comprises:
    determining the first deflection angle based on the law of cosines according to the first distance, the second distance and the initial distance; the first deflection angle is an included angle between a line from the current position of the mobile device to the wearable device and a line from the initial position of the mobile device to the wearable device.

2. The method of claim 1, wherein the step of acquiring a first distance between a current position and an initial position of a mobile device comprises:
    detecting the first distance by a distance measurement unit arranged on the mobile device.

3. The method of claim 1, wherein the step of acquiring a second deflection angle of the wearable device reflecting a posture change comprises:
    detecting the second deflection angle by an angle measurement unit arranged on the wearable device.

4. The method of claim 1, wherein the step of determining relative position information between the mobile device and the wearable device according to the first deflection angle, the second deflection angle and the second distance comprises the following steps:
 obtaining a relative azimuth angle between the mobile device and the wearable device according to the first deflection angle and the second deflection angle; and
 determining the relative position information according to the relative azimuth angle and the second distance.

5. The method of claim 1, wherein the step of processing an audio signal based on the relative position information to obtain a playing audio played by the wearable device comprises the following steps:
 determining head-related parameters of the wearable device and the mobile device according to the relative position information; and
 processing the audio signal by remapping based on the head-related parameters to obtain the playing audio.

6. The method of claim 1, wherein before the step of acquiring a first distance between a current position and an initial position of a mobile device, and a second distance between the current position of the mobile device and a wearable device, the method also comprises:
 detecting a state of a trigger switch on the mobile device, and executing the step of acquiring the first distance and the second distance in response to turn-on of the trigger switch.

7. The method of claim 1, wherein the step of acquiring a second deflection angle of the wearable device reflecting a posture change comprises:
 obtaining the second deflection angle by resolving a measured signal from an measuring device arranged on the wearable device.

8. The method of claim 1, wherein the step of acquiring a second deflection angle of the wearable device reflecting a posture change comprises the following steps:
 detecting the second deflection angle by an angle measurement unit arranged on the wearable device; and
 obtaining the second deflection angle by resolving a measured signal from an inertial measuring device arranged on the wearable device.

9. The method of claim 1, wherein the step of acquiring a second distance between the current position of the mobile device and a current position of a wearable device comprises:
 detecting the second distance by the distance measurement unit arranged on at least one of the mobile device and on the wearable device.

10. An electronic device, comprising:
 a processor; and
 a memory, storing computer-readable instructions for the processor; when the computer instructions are read, the processor is configured to:
 acquire a first distance between a current position and an initial position of a mobile device, and a second distance between the current position of the mobile device and a wearable device; the mobile device and the wearable device are in communication connection;
 determine a first deflection angle of the mobile device according to the first distance, the second distance and the initial distance between the mobile device and the wearable device;
 acquire a second deflection angle of the wearable device reflecting a posture change;
 determine relative position information between the mobile device and the wearable device according to the first deflection angle, the second deflection angle and the second distance; and
 process an audio signal based on the relative position information to obtain a playing audio played by the wearable device;
wherein the processor is further configured to:
 determine the first deflection angle based on the law of cosines according to the first distance, the second distance and the initial distance;
wherein the first deflection angle is an included angle between a line from the current position of the mobile device to the wearable device and a line from the initial position of the mobile device to the wearable device.

11. The device according to claim 10, wherein the processor is further configured to:
 detect the first distance by a distance measurement unit arranged on the mobile device; and
 detect the second distance by the distance measurement unit arranged on at least one of the mobile device and the wearable device.

12. The device according to claim 10, wherein the processor is further configured to:
 detect the second deflection angle by an angle measurement unit arranged on the wearable device.

13. The device according to claim 10, wherein the processor is further configured to:
 obtain a relative azimuth angle between the mobile device and the wearable device according to the first deflection angle and the second deflection angle; and
 determine the relative position information according to the relative azimuth angle and the second distance.

14. The device according to claim 10, wherein the processor is further configured to:
 determine head-related parameters of the wearable device and the mobile device according to the relative position information; and
 process the audio signal by remapping based on the head-related parameters to obtain the playing audio.

15. The device according to claim 10, wherein the processor is further configured to:
 detect a state of a trigger switch on the mobile device, and executing the step of acquiring the first distance and the second distance in response to turn-on of the trigger switch.

16. The device according to claim 10, wherein the processor is further configured to:
 obtain the second deflection angle by resolving a measured signal from an initial inertial measuring device arranged on the wearable device.

17. The device according to claim 10, wherein the processor is further configured to:
 detect the second deflection angle by an angle measurement unit arranged on the wearable device; and
 obtain the second deflection angle by resolving a measured signal from an initial inertial measuring device arranged on the wearable device.

18. A non-temporary storage medium, used for storing the computer-readable instructions; the computer-readable instructions are used for enabling a computer to execute an audio signal processing method, the method comprises:
 acquiring a first distance between a current position and an initial position of a mobile device, and a second distance between the current position of the mobile device and a wearable device; the mobile device and the wearable device are in communication connection;
 determining a first deflection angle of the mobile device according to the first distance, the second distance and the initial distance between the mobile device and the wearable device;

acquiring a second deflection angle of the wearable device reflecting a posture change;

determining relative position information between the mobile device and the wearable device according to the first deflection angle, the second deflection angle and the second distance; and processing an audio signal based on the relative position information to obtain a playing audio played by the wearable device;

wherein the step of determining a first deflection angle of the mobile device according to the first distance, the second distance and the initial distance between the mobile device and the wearable device comprises:

determining the first deflection angle based on the law of cosines according to the first distance, the second distance and the initial distance; the first deflection angle is an included angle between a line from the current position of the mobile device to the wearable device and a line from the initial position of the mobile device to the wearable device.

* * * * *

UNITED STATES PATENT AND TRADEMARK OFFICE
CERTIFICATE OF CORRECTION

PATENT NO. : 11,950,087 B2
APPLICATION NO. : 17/703494
DATED : April 2, 2024
INVENTOR(S) : Kai Wang et al.

Page 1 of 1

It is certified that error appears in the above-identified patent and that said Letters Patent is hereby corrected as shown below:

In the Claims

In Column 17, Line 31, in Claim 7, delete "measuring" and insert -- inertial measuring --, therefor.

In Column 18, Line 46, in Claim 16, delete "initial inertial" and insert -- inertial --, therefor.

In Column 18, Line 53, in Claim 17, delete "initial inertial" and insert -- inertial --, therefor.

Signed and Sealed this
Eighteenth Day of June, 2024

Katherine Kelly Vidal
*Director of the United States Patent and Trademark Office*